United States Patent
Kato

(10) Patent No.: US 7,454,366 B2
(45) Date of Patent: Nov. 18, 2008

(54) PRODUCT MANAGEMENT SYSTEM AND METHOD

(75) Inventor: Yumi Kato, Tokyo (JP)

(73) Assignee: Sony Corporation, Tokyo (JP)

( * ) Notice: Subject to any disclaimer, the term of this patent is extended or adjusted under 35 U.S.C. 154(b) by 775 days.

(21) Appl. No.: 10/299,560

(22) Filed: Nov. 19, 2002

(65) Prior Publication Data
US 2003/0097275 A1    May 22, 2003

(30) Foreign Application Priority Data
Nov. 19, 2001  (JP)  ............................ P2001-353735

(51) Int. Cl.
*G06Q 20/00* (2006.01)

(52) U.S. Cl. ...................................................... 705/21
(58) Field of Classification Search .................. 705/21, 705/26, 27; 707/100, 101, 102
See application file for complete search history.

(56) References Cited

U.S. PATENT DOCUMENTS

| | | | | |
|---|---|---|---|---|
| 6,751,624 B2 * | 6/2004 | Christal et al. | ............... | 707/101 |
| 6,965,935 B2 * | 11/2005 | Diong | ......................... | 709/224 |
| 2003/0023524 A1 * | 1/2003 | Sugimoto et al. | ............. | 705/34 |
| 2003/0028612 A1 * | 2/2003 | Lin et al. | ..................... | 709/217 |
| 2003/0208444 A1 * | 11/2003 | Sauer | ........................ | 705/40 |
| 2004/0102993 A1 * | 5/2004 | Yoshida et al. | ................. | 705/1 |
| 2004/0117383 A1 * | 6/2004 | Lee et al. | ..................... | 707/100 |

\* cited by examiner

*Primary Examiner*—Ronald Laneau
(74) *Attorney, Agent, or Firm*—Bell, Boyd & Lloyd LLP

(57) ABSTRACT

A system and method of managing products includes a server which is networked with a plurality of terminals to provide users of the terminals with proper support. When a support event occurs at any terminal, the terminal requests the server, through a requesting section, for support via a network, along with an IP address. The server, which includes a database containing registration information such as IP addresses and purchase dates registered when the terminals are purchased, receives the request including the IP address via a receiver, and searches for relevant registration information contained in the database in accordance with the IP address to provide the requested support.

16 Claims, 13 Drawing Sheets

FIG. 3

| IP ADDRESS | PURCHASE DATE |
|---|---|
| 4567::5A10 | 2000/05/06 |
| 5678::5B20 | 2002/03/20 |
| 6789::5C30 | 2003/06/28 |

FIG. 7

| IP ADDRESS | PURCHASE DATE | SUPPORT PASSWORD |
|---|---|---|
| 4567::5A10 | 2000/05/06 | ABC123 |
| 5678::5B20 | 2002/03/20 | CDE456 |
| 6789::5C30 | 2003/06/28 | FGH789 |

FIG. 11

| SERIAL NUMBER | IP ADDRESS | PURCHASE DATE |
|---|---|---|
| 1234 | 4567::5A10 | 2001/09/26 |
| 2345 | 5678::5B20 | 2002/10/31 |
| 3456 | 6789::5C30 | 2003/06/28 |

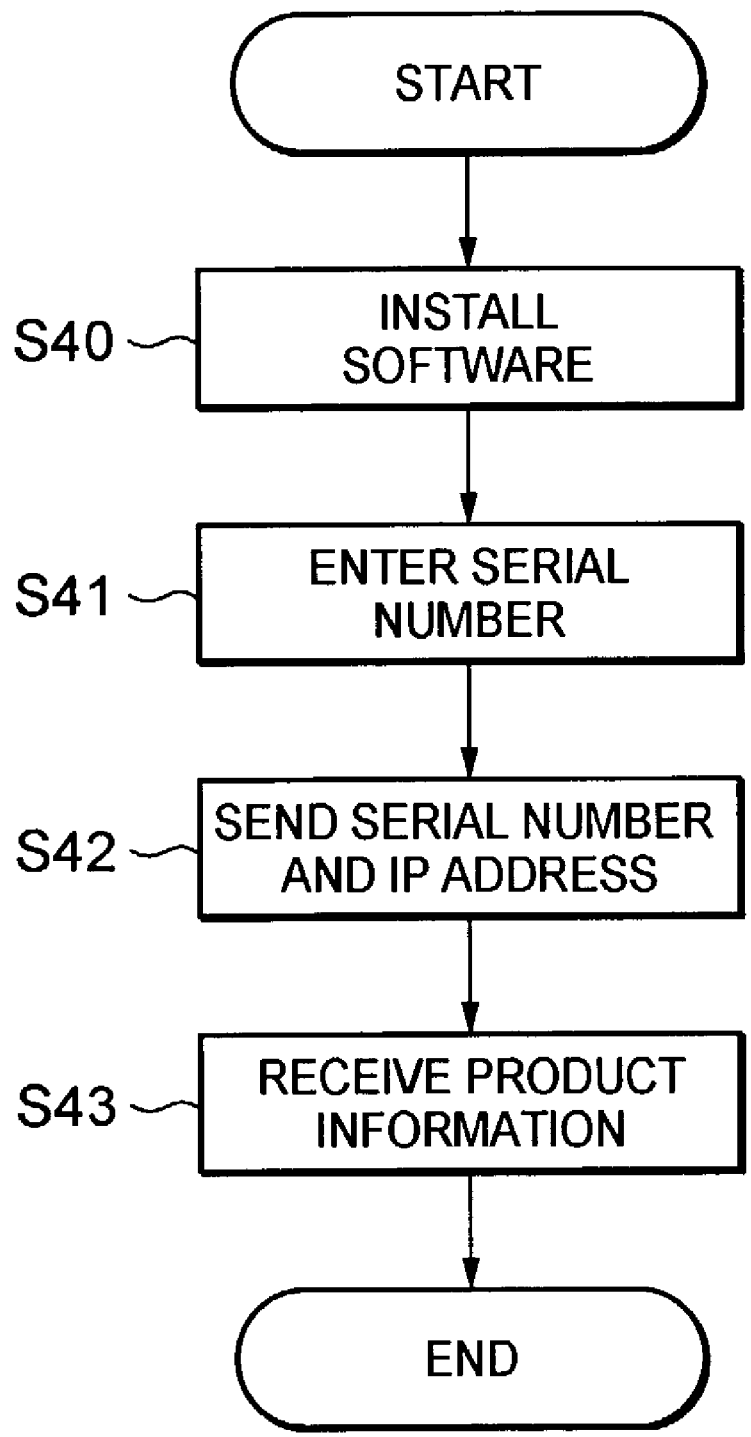

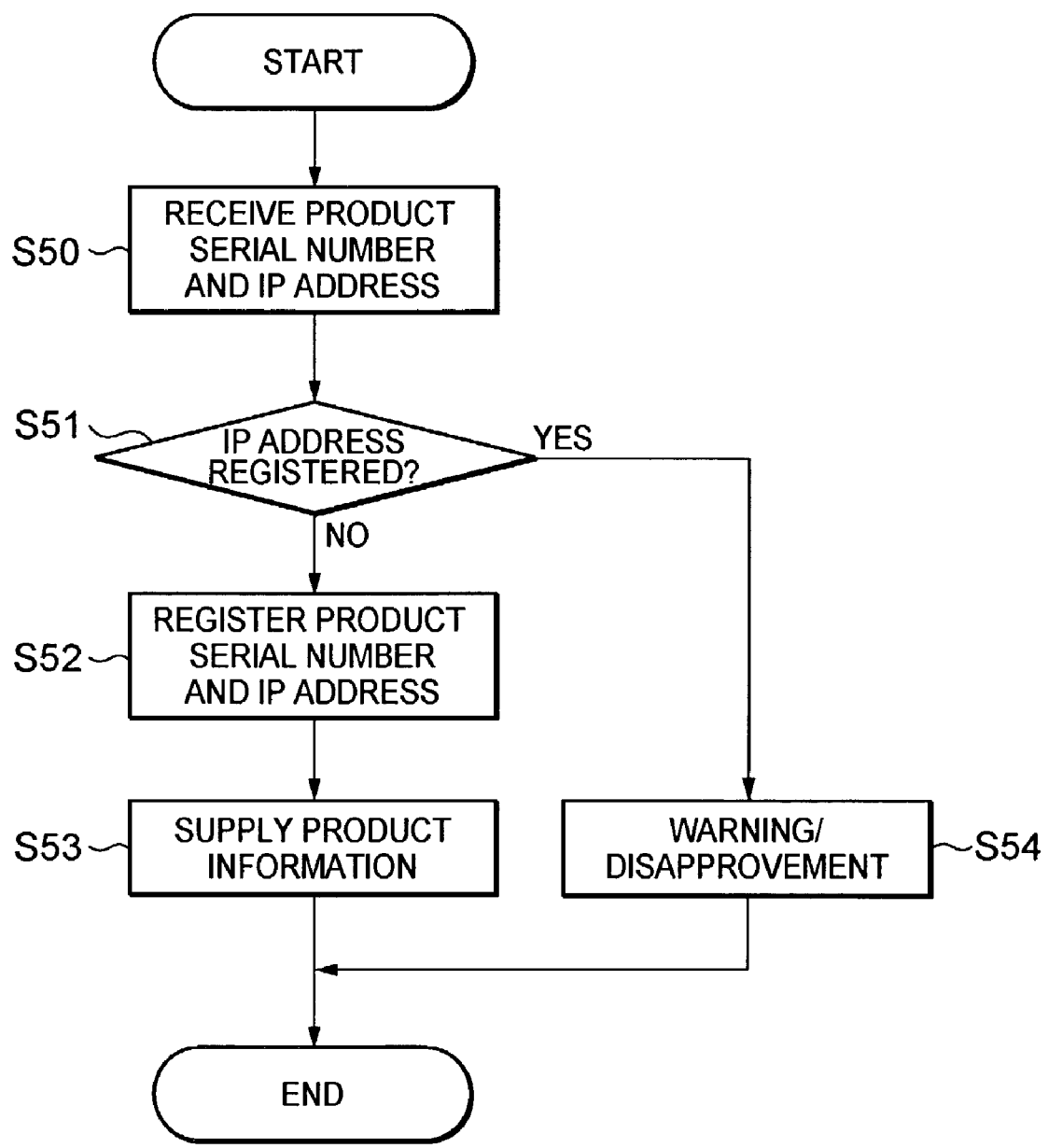

PRODUCT MANAGEMENT SYSTEM AND METHOD

CROSS REFERENCE TO RELATED APPLICATIONS

The present document is based on Japanese Priority Document JP 2001-353735, filed in the Japanese Patent Office on Nov. 19, 2001, the entire contents of which being incorporated herein by reference.

BACKGROUND OF THE INVENTION

The present invention relates to a system and method of managing products, and more particularly, to a system and method of managing products over a network.

When a user purchases electronic equipment such as a television or a personal computer (PC), the purchased equipment comes with a warranty on which a purchase date, a shop name, etc. are written. When the equipment fails, the user brings the equipment to the shop together with the warranty to have the shop fix it free of charge if the equipment is still under warranty, or for pay if it is out of warranty, for example. This is how purchased equipment is typically serviced in traditional ways of product management.

A next-generation Internet addressing technology, IPv6 (Internet Protocol version 6), is now being implemented for use in advanced networking in the coming years. A key feature of IPv6 is its ability to meet impending needs for more addresses, with its space available for as many as 128 bits (i.e., $3.4 \times 10^{38}$ addresses available), making its predecessor, IPv4, obsolete. Under IPv6, even home appliances such as televisions can have their IP addresses, in addition to PCs, allowing home appliances to be linked with servers so that the servers can render service and support under networked product management.

In some situations under the above-described traditional product management based on warranties, a user of electronic equipment who has lost its warranty card can no longer have it serviced under warranty, i.e., the user has to have the equipment serviced at his or her expense, even within the warranty period. In these situations, a new approach to product management is called for.

Additionally, in some other situations, even if a manufacturer sells a software product under a licensing agreement that the product be used by only one PC, a user often installs the software product to multiple PCs. In still other situations, a user feels cumbersome when upgrading software, and a user may be hassled to find right solutions to some wrong PC settings. Also in these situations, a need is felt for an improved mechanism of product management.

SUMMARY OF THE INVENTION

In order to satisfy the above and other needs, the present invention provides a system and method of managing products which can authenticate a warranty period without checking a warranty, and which can provide ease in setting up equipment and upgrading software while preventing unauthorized use of the software.

In one embodiment, the present invention provides a system of managing products via a network. In the method, the system comprises: a plurality of terminal devices each having registration information, wherein the registration information comprises at least an IP address and a purchase date of the terminal device, or the IP address, a serial number and a purchase date of a product introduced into the terminal device; and a server that receives the IP address via the network, and searches the registration information in accordance with the IP address.

In another embodiment, the present invention provides a method of managing products between a server and a plurality of terminal devices via a network. The method includes registering registration information with the server, wherein the registration information comprises at least an IP address and a purchase date of each of said terminal devices, or the IP address, a serial number and a purchase date of a product introduced into the terminal device; receiving a support request and the IP address from the terminal device via the network when a support event occurs on the terminal device; searching the registration information in accordance with the IP address; and providing the terminal device with support suitable for the support event. The method also includes sending a support request and the IP address to the server via the network when a when a support event occurs on the terminal device.

According to the above embodiments of the present invention, the IP address and purchase date of each terminal device, or the IP address, the serial number and purchase date of a product introduced into the terminal device are registered in the server, and hence there is no need to issue warranties. That is, the server can check, without recourse to a warranty, whether or not any terminal device accessing the server via the network is still under warranty only by referencing its IP address.

Moreover, by causing any terminal device to inform the server of its IP address and current settings when a setting problem occurs on the terminal device, a user of the terminal device can solve the setting problem via support from a manufacturer of the terminal device.

Furthermore, by causing a user, when the user introduces a product such as software into a terminal device, to send the serial number of the product and the IP address of the terminal device via the network for registration in a server located at a manufacturer of the product, the manufacturer of the product can upgrade the product automatically at the accessing terminal directly online, or provide product information by e-mail, for example, from time to time, while preventing unauthorized use of the software.

BRIEF DESCRIPTION OF THE FIGURES

The above and other features and advantages of the present invention will become more apparent from the following description of the presently preferred exemplary embodiments of the present invention taken in conjunction with the accompanying drawings, in which:

FIG. 3 shows exemplary information items registered in a database;

FIG. 7 shows exemplary information items registered in a database;

FIG. 11 shows exemplary information items registered in a database;

FIG. 12 is a flowchart showing steps of an exemplary product management method performed by a terminal under the product management system of FIG. 10; and FIG. 13 is a flowchart showing steps of the exemplary product management method performed by a server under the product management system of FIG. 10.

DETAILED DESCRIPTION OF THE INVENTION

Figure 1:
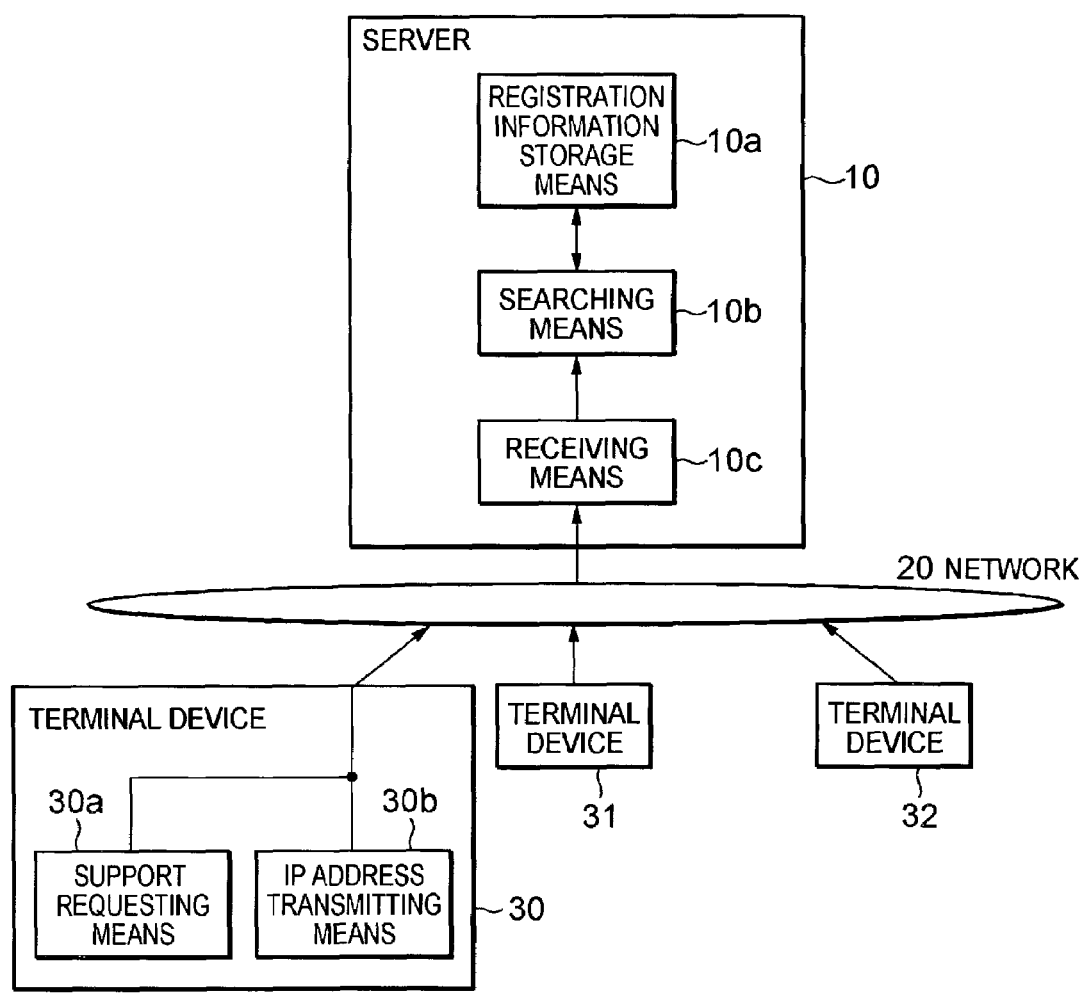
FIG. 1 illustrates the principles of a product management system according to the present invention.

Referring now to FIG. 1, the inventive principles of a product management system according to the present invention will be discussed. The product management system shown in FIG. 1 comprises a server 10, and a plurality of terminal devices 30, 31 and 32 coupled to the server 10 via a network 20. The terminal devices 30 to 32 may be personal computers (PCs), digital televisions, etc. having IP (Internet Protocol) addresses and thus accessible to IP networks.

The network 20 is an IPv6 network. The server 10 includes registration information storage means 10a storing registration information including at least IP addresses and purchase dates of the terminal devices 30 to 32, or their IP addresses, serial numbers an purchase dates of software installed in the terminal devices, searching means 10b for searching relevant registration information stored in the registration information storage means 10a in accordance with an IP address, and receiving means 10c for receiving at least an IP address and a support request from any of the terminal devices 30 to 32.

The terminal device 30 includes support requesting means 30a for sending a support request to the server 10, and IP address transmitting means 30b for sending an IP address of the terminal device 30 to the server 10 simultaneously with sending the support request, via the network 20. It should be recognized that the other terminal devices 31 and 32 are similar to the terminal device 30 in their configuration and operation, and may hence be represented by the terminal device 30 in the following description whenever appropriate. In procedure, each of the terminal devices 30 to 32 communicates with the server 10 under administration of the product management system in order to cope with a support event.

If the terminal device 30 suffers a failure, which is a support event, then a user of the terminal device 30 sends via the support requesting means 30a a support request to inform the server 10 of the failure, while at the same time, the IP address transmitting means 30b sends the terminal's IP address to the server 10, via the network 20. The server 10 receives the support request and IP address at its receiving means 10c. Since the server 10 has the storage means 10a in which the registration information including the IP address and the purchase date which were registered at the time when each of the terminal device 30 to 32 is purchased, its searching means 10b searches for necessary registration information in accordance with the IP address received. In this way, the server 10 can determine whether the requesting terminal device 30 is under warranty or not.

Figure 2:
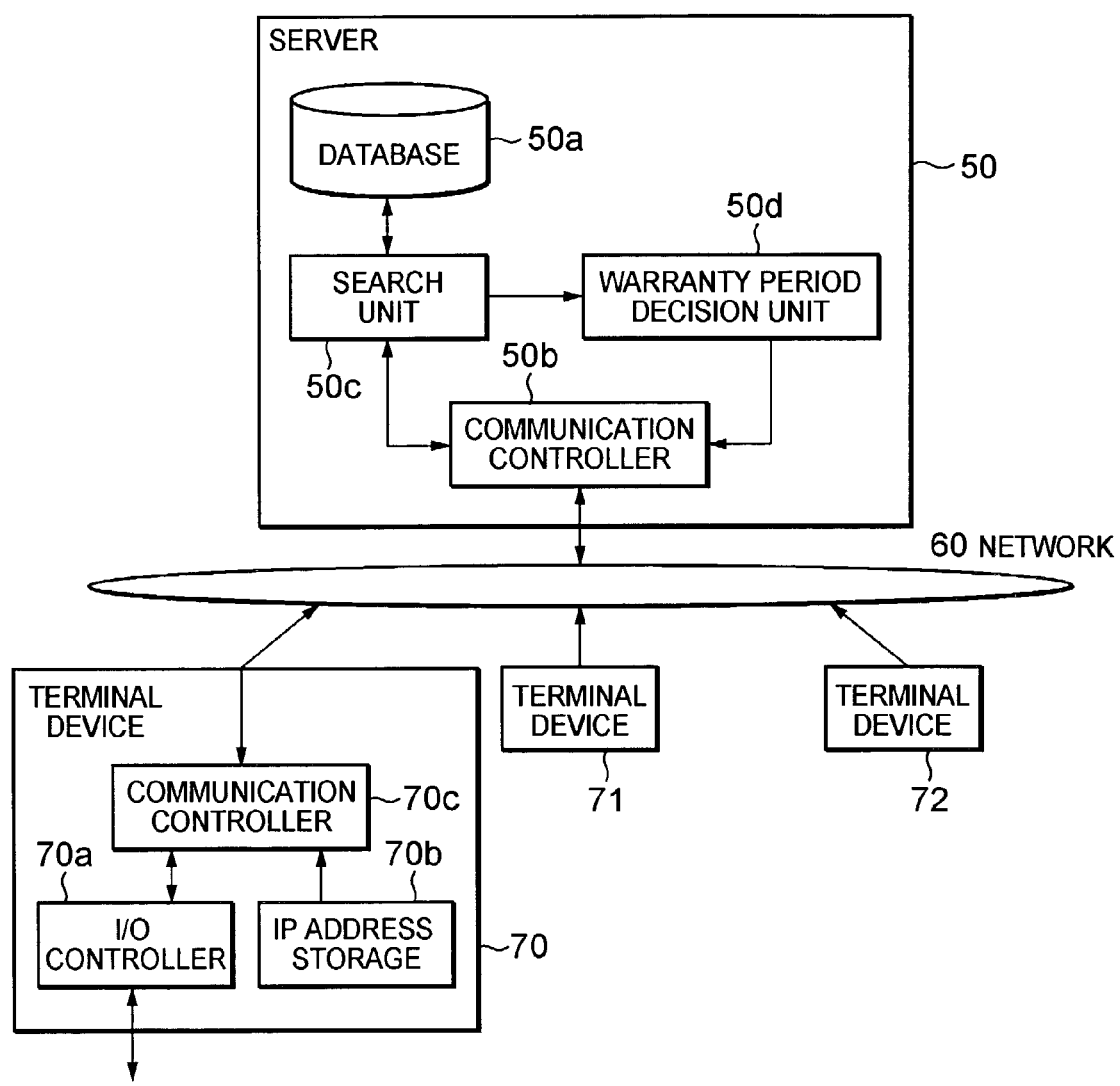
FIG. 2 shows an exemplary configuration of a product management system according to the present invention.

Referring next to FIGS. 2 through 5, a product management system and method according to a first embodiment of the present invention will be described. As shown in FIG. 2, an example product management system according to the first embodiment comprises a server 50, and a plurality of terminals 70, 71 and 72 coupled to the server 50 via a network 60. It should be recognized that the terminals 71 and 72 are configured and operate similar to the terminal 70 and may hence be represented by the terminal 70 in the following description whenever appropriate.

The server 50 is arranged in a shop, for example. The network 60 operates under IPv6. The terminals 70 to 72 can be PCs, digital televisions, etc, having IP addresses and communicatable over IP networks. The server 50 comprises a database 50a in which at least IP addresses and purchase dates of the terminals 70 to 72 are registered as registration information when these terminals are purchased, a communication controller 50b for controlling communication with the terminals 70 to 72 via the network 60, a search unit 50c that searches specific registration information in the database 50a in accordance with an IP address received, and a warranty period decision unit 50d that determines a warranty period from a purchase date searched by the search unit 50c. The warranty period decision unit 50d sends its result to the communication controller 50b. The database 50a may be any storage including a HD (Hard Disk).

As presented in FIG. 3, the database 50a contains registration information, such as, for example, IP addresses and purchase dates, which are registered whenever any of the terminals is purchased. The communication controller 50b may be, for example, a modem, and allows the server 50 and the terminals 70 to 72 to exchange information via the network 60 under control of a Central Processing Unit (CPU) (not shown). The search unit 50c and the warranty period decision unit 50d may constitute a functional block operable by programs stored on a storage such as a Read-Only Memory (ROM) (not shown) under control of the CPU.

The terminal 70 includes an input/output (I/O) controller 70a that receives input from a user and provides output to a display (not shown), an IP address storage 70b that stores an IP address of the terminal 70, and a communication controller 70c for controlling communication with the server 50 via the network 60. The communication controller 70c may be a modem, for example, communicable with the server 50 via the network 60 under control of a CPU (not shown). The I/O controller 70a operable by a program stored on, for example, a ROM (not shown) receives inputs from a user and displays process results on the display (not shown). The IP address storage 70b can be a ROM or similar devices, and stores a device-specific IP address (device ID).

Figure 4:
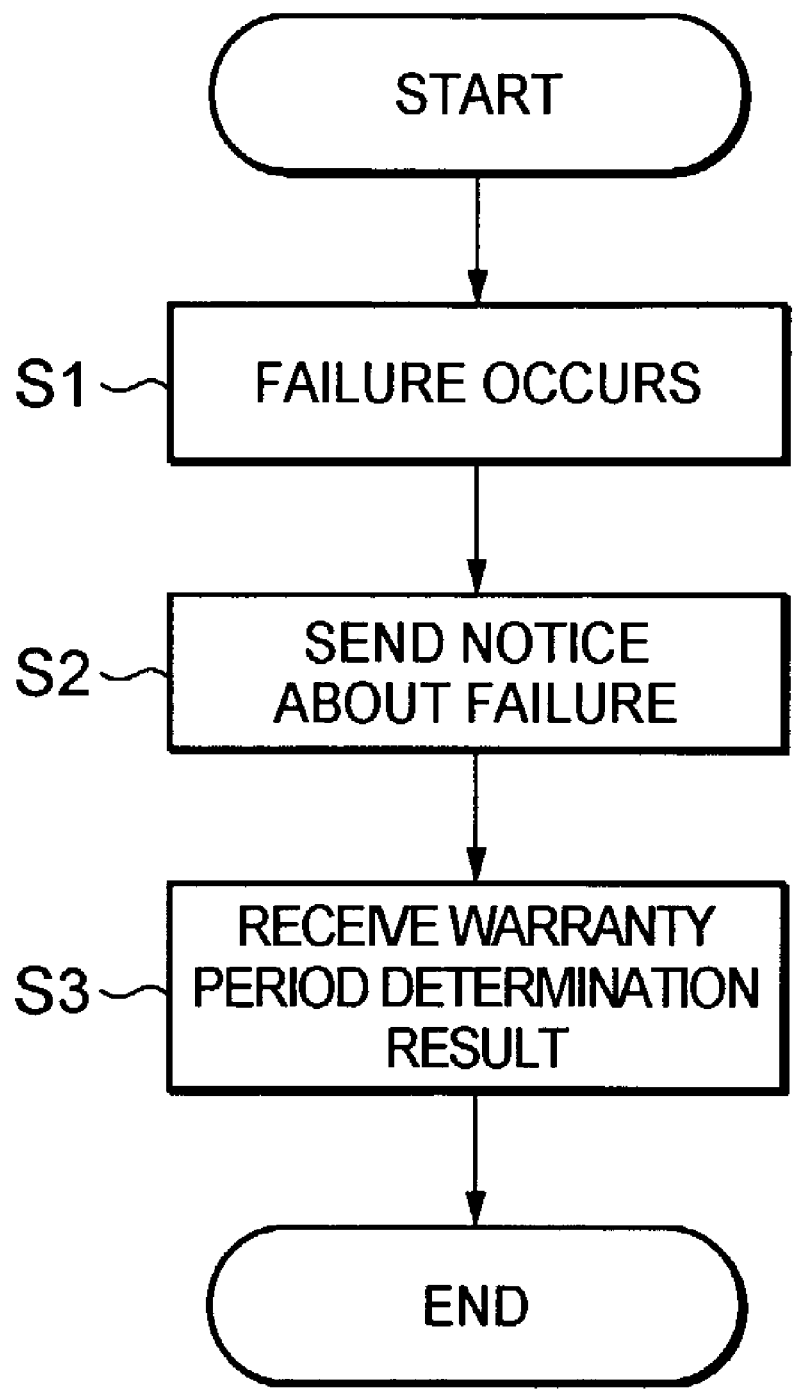
FIG. 4 is a flowchart showing steps of an exemplary product management method performed by a terminal under the product management system of FIG. 2.
Figure 5:
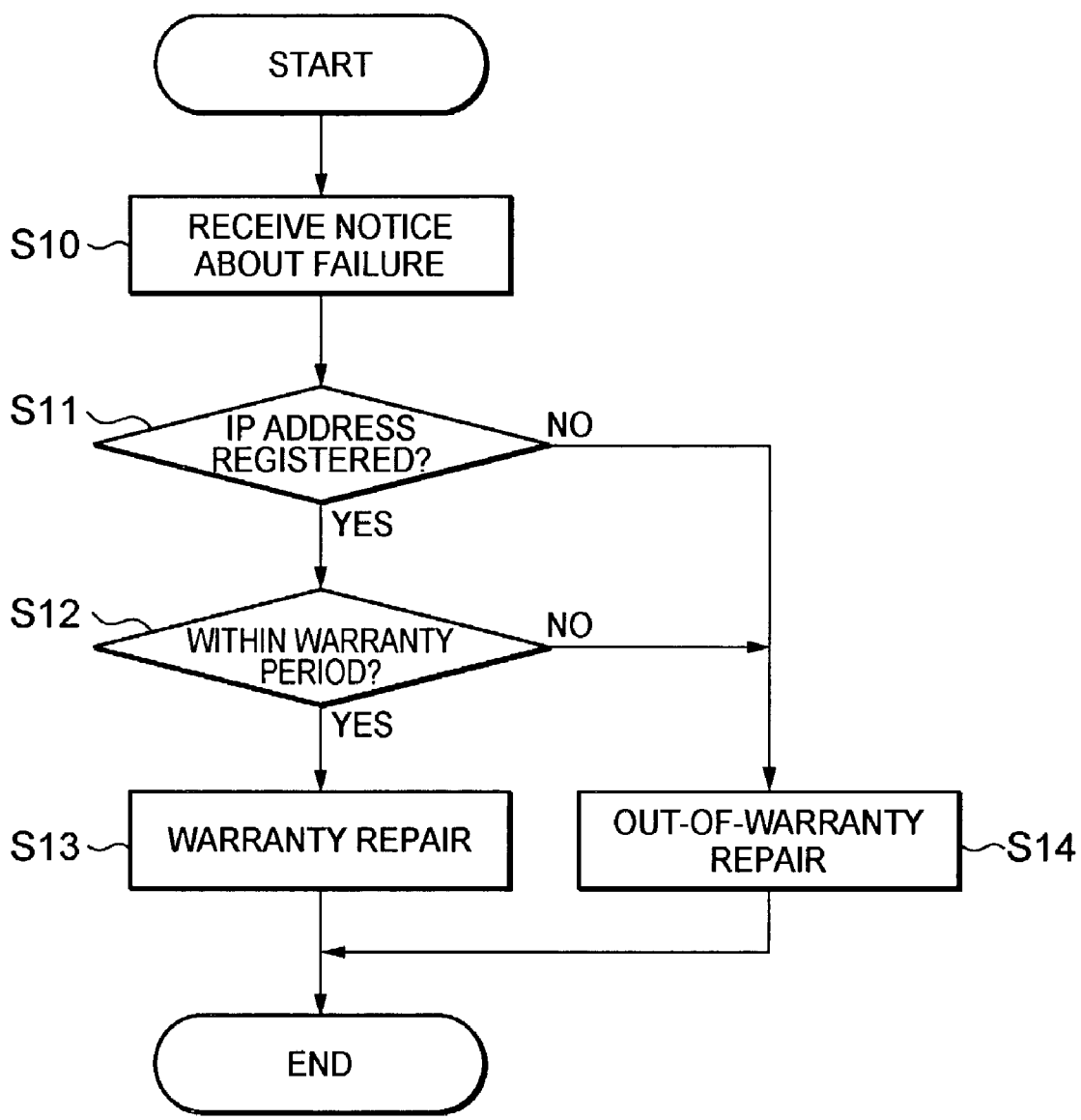
FIG. 5 is a flowchart showing steps of the exemplary product management method performed by a server under the product management system of FIG. 2.

Turning now to flowcharts shown in FIGS. 4 and 5, steps are described of an example product management method according to the first embodiment. These steps are performed by communication between any of the terminals 70 to 72 and the server 50 under administration of the product management system of FIG. 2 in order to cope with a support event.

The flowchart of FIG. 4 shows a terminal side process performed in the product management method according to the first embodiment. At step S1, a failure occurs. Here, it is assumed that a failure occurs in the terminal 70 as an example of the support event. At step S2, the failure is notified. When the terminal 70 fails, a user of the terminal 70 prepares a notice about the failure through the I/O controller 70a and sends the notice to the server 50 via the network 60. The IP address stored in the IP address storage 70b accompanies the notice.

At step S3, a notice about whether or not the terminal is within a warranty period is received. After a completion of a process related to warranty on the server side in response to the failure notice (described in more detail below), the terminal 70 receives from the server 50 a notice about whether or not it is still under warranty via the communication controller 70c, and also displays it on the display (not shown) through the I/O controller 70a to ensure that the user learns of the result.

The flowchart of FIG. 5, in turn, shows a server side process performed in the above product management method according to the first embodiment. The following description explains the case of a failure in the terminal 70. At step S10, the notice about the failure from the terminal is received. The communication controller 50b of the server 50 receives the notice about the failure and the IP address from the terminal 70 via the network 60.

At step S11, whether or not the IP address is registered is checked. The search unit 50c checks whether or not the IP address received is registered in the database 50a. If so, the process proceeds to step S12; otherwise, it jumps to step S14. At step S12, whether or not the failed terminal is within a warranty period is determined. After that the IP address of the terminal 70 is registered is confirmed in step S11, the search unit 50c further searches the database 50a to find a registered purchase date of the terminal 70, and the warranty period decision unit 50d then determines whether or not the terminal 70 is within the warranty period by comparison of the registered purchase date with a current date. If the terminal 70 is within the warranty period, the process proceeds to step S13, and if not, to step S14.

At step S13, a notice that a warranty repair will be offered is sent to the terminal. When the terminal 70 is found to be still under warranty in step S12, the server 50 causes its communication controller 50b to inform the terminal 70 via the network 60 that the terminal 70 will be fixed gratis.

At step S14, a notice that an out-of-warranty repair will be provided is sent to the terminal. When it is determined that the IP address of the terminal 70 is not registered in step S11 or that the terminal 70 is out of warranty in step S12, the communication controller 50b informs the terminal 70 via the network 60 that a chargeable repair will be provided together with its reason.

In this way, once the IP addresses and purchase dates of the terminals 70 to 72 are registered in the database 50a of the server 50 located at a shop when the terminals are purchased, a user of a failed terminal can check whether or not his or her terminal is still under warranty by sending the terminal's IP address to the server 50. Consequently, a certificate of warranty is no longer needed.

Figure 6:
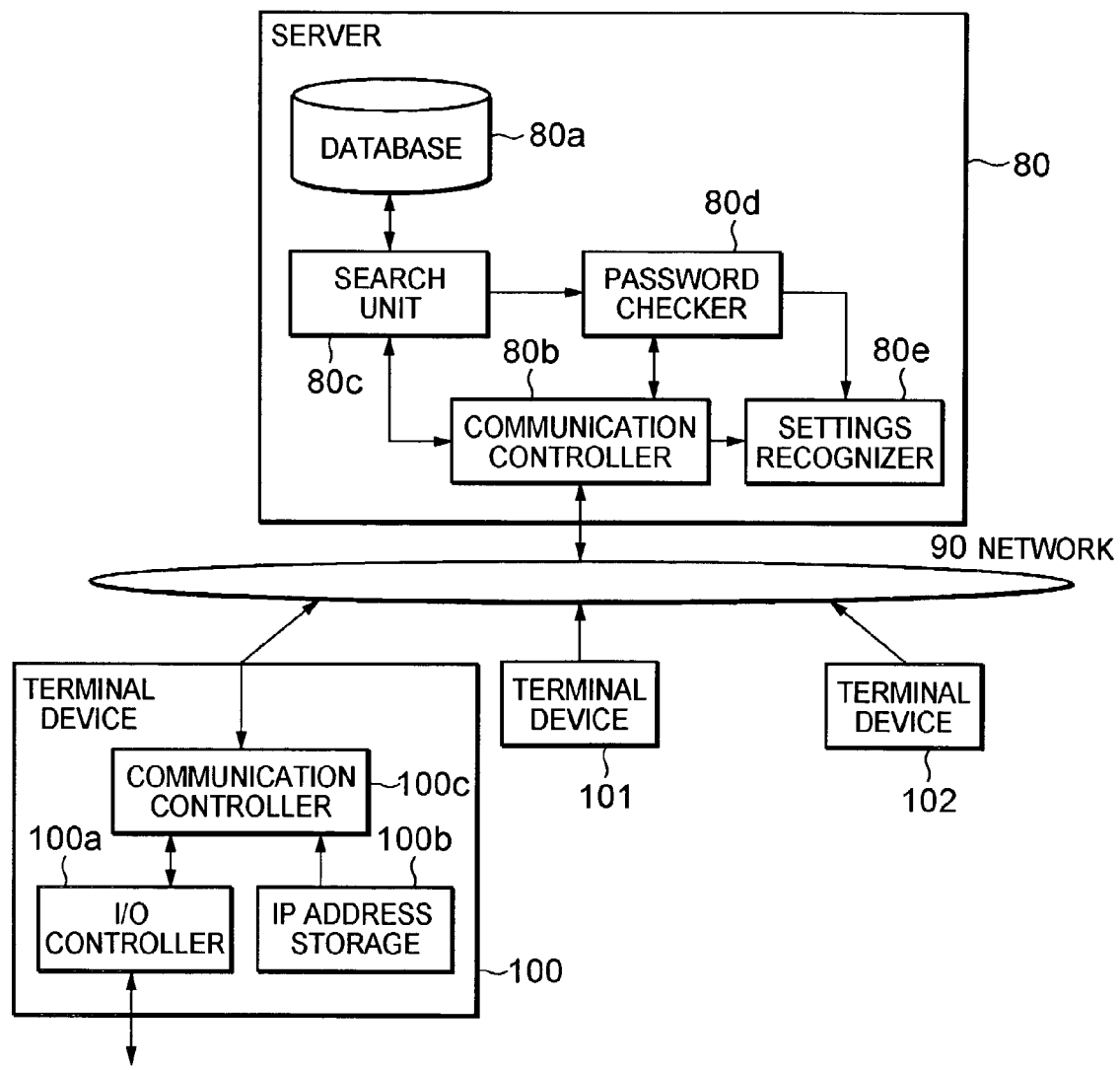
FIG. 6 shows another exemplary configuration of a product management system according to the present invention.

Referring then to FIGS. 6 through 9, a product management system and method according to a second embodiment of the present invention will be described. As shown in FIG. 6, an exemplary product management system according to the second embodiment comprises, similar to the first embodiment, a server 80 and a plurality of terminals 100, 101 and 102 linked to the server 80 via a network 90. It should be recognized that the terminals 101 and 102 are configured and operate similar to the terminal 100 and may hence be represented by the terminal 100 in the following description whenever appropriate.

In the second embodiment, the server 80 is located, for example, with a manufacturer, which is different from the first embodiment. The network 90 is a network established under Ipv6. The terminals 100 to 102 may be PCs and digital televisions having IP addresses and IP connectable. The server 80 is provided with a database 80a in which at least IP addresses, purchase dates, and support passwords of the terminals 100 to 102 are registered as registration information at the time of their purchase, a communication controller 80b for controlling exchange of information with the terminals 100 to 102 via the network 90, a search unit 80c that searches for particular registration information contained in the database 80a in accordance with the IP address received, a password checker 80d that verifies whether or not a password entered from any of the accessing terminals 100 to 102 matches a support password searched by the search unit 80c, and a settings recognizer 80e that recognizes what settings users have made to their terminals 100 to 102. The database 80a may be for example, a HD (Hard Disk) storing registration information.

As presented in FIG. 7, the registration information registered in the database 80a includes, for example, IP addresses, purchase dates, and support passwords which are added every time a terminal is purchased. The communication controller 80b, such as a modem, for example, enables the server 80 to transfer information to and from the terminals 100 to 102 via the network 90 under the control of a CPU (not shown). The search unit 80c, password checker 80d and settings recognizer 80e may be a functional block executable by programs stored on, for example, a ROM (not shown) under the control of the CPU. Since the terminals 100 to 102 are similar to their counterparts 70 to 72 in the first embodiment as mentioned above, their description is omitted.

Figure 8:
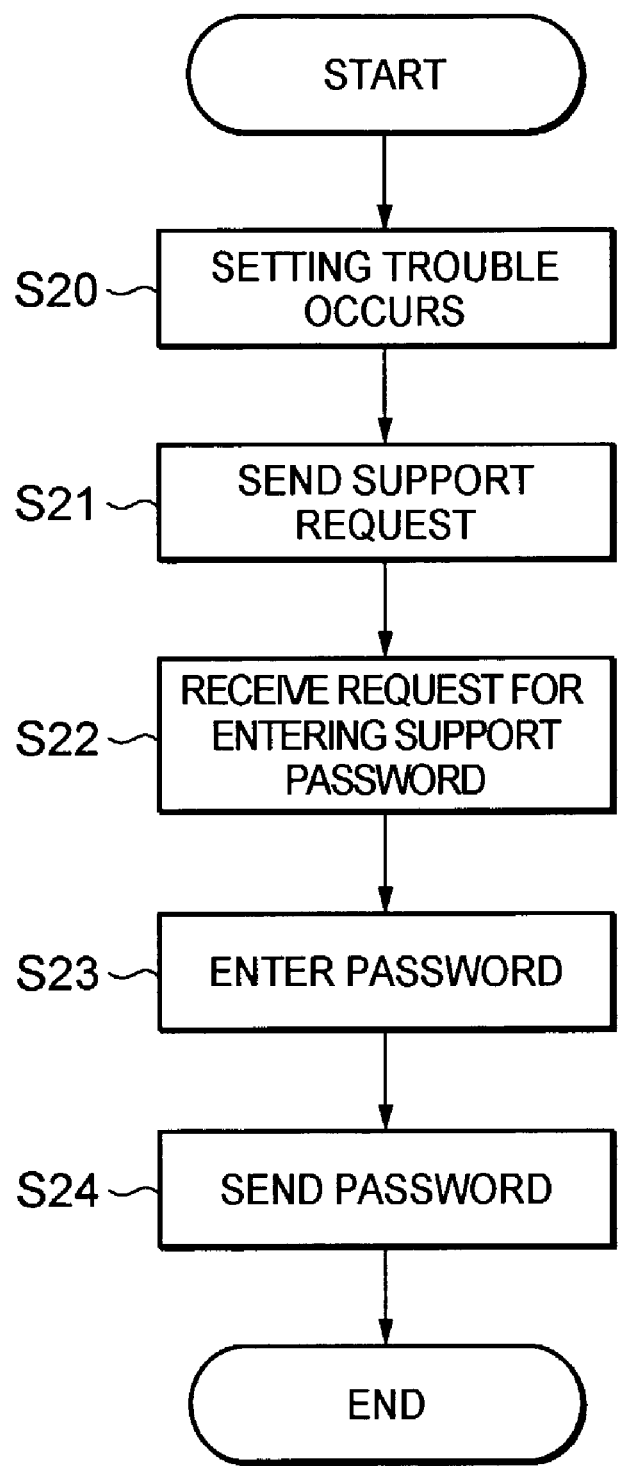
FIG. 8 is a flowchart showing steps of an exemplary product management method performed by a terminal under the product management system of FIG. 6.
Figure 9:
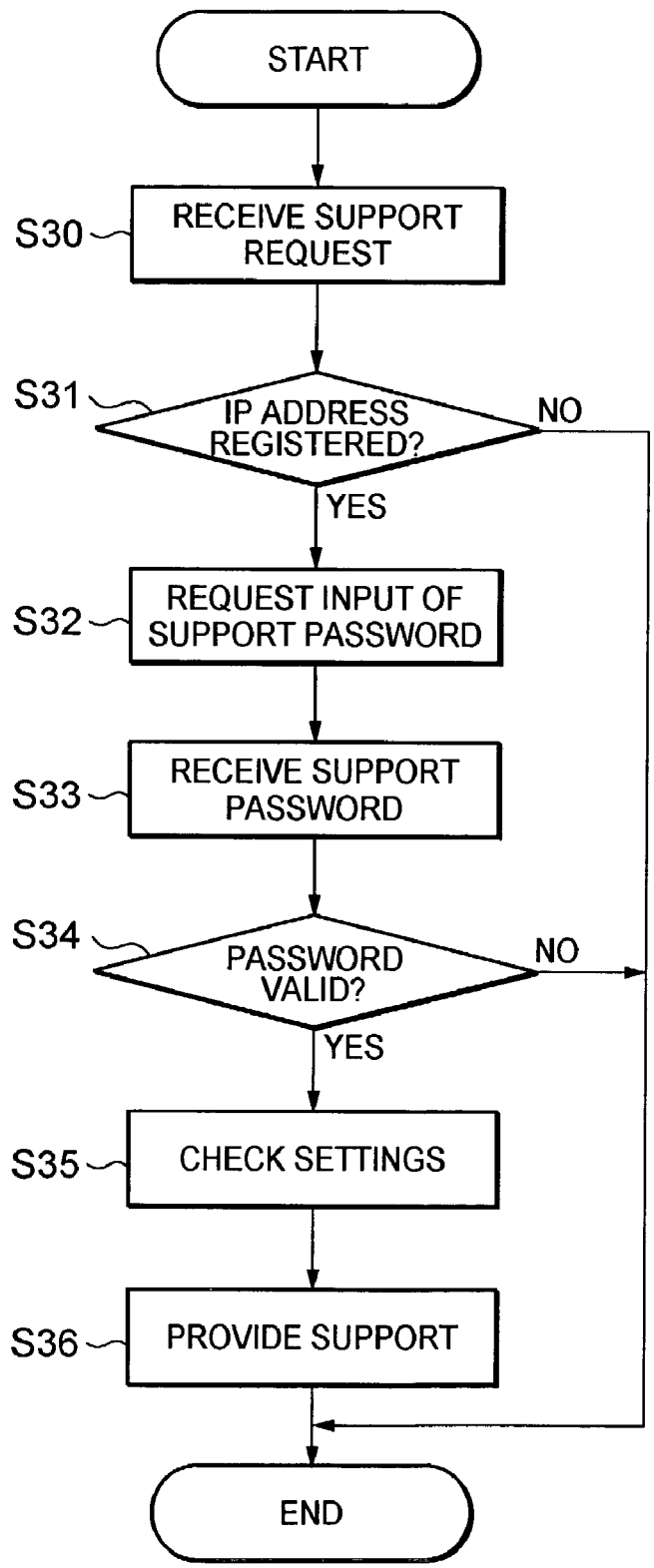
FIG. 9 is a flowchart showing steps of the exemplary product management method performed by a server under the product management system of FIG. 6.

Turning now to flowcharts shown in FIGS. 8 and 9, steps are described of an exemplary product management method according to the second embodiment. These steps are performed by communication sessions between any of the terminals 100 to 102 and the server 80 under administration of the product management system of FIG. 6 in order to cope with a support event.

The flowchart of FIG. 8 shows a terminal side process performed in the product management method according to the second embodiment. At step S20, setting trouble occurs. Here, it is assumed that wrong settings are made by a user of the terminal 100 as an example of the support event.

At step S21, a support request is sent to the server together with the IP address. The user of the terminal 100 enters a support request via an I/O controller 100a and sends it to the server 80 via the network 90, along with the IP address stored in an IP address storage 100b.

At step S22, a request from the server for entering a support password is received. The terminal 100 receives via a communication controller 100c a request from the server 80 that a support password be entered, which is also displayed on a display (not shown) via its I/O controller 100a to remind the user of the request. If the password of the terminal 100 is not registered, then the server 80 sends a message to that effect to the terminal 100, which, in turn, receives the message via its communication controller 100c and displays it on, for example the display (not shown) as interfaced by the I/O controller 100a.

At step S23, the support password is entered. The user enters his or her support password added to the database 80a on or after having purchased the terminal 100, over the display as interfaced by the I/O controller 100a. At step S24, the support password is sent to the server. The communication controller 100c of the terminal 100 sends the support password entered in step S23 to the server 80 via the network 90.

The flowchart of FIG. 9, in turn, shows a server side process performed in the above product management method according to the second embodiment, responsive to the support request including the IP address from the terminal 100 plagued by the wrong settings. At step S30, the support request from the terminal is received. The communication controller 80*b* of the server 80 receives both the support request and IP address from the terminal 100 via the network 90.

At step S31, the IP address registered is checked. The server 80 activates its search unit 80*c* to check whether or not the IP address received in the step S30 is registered in the database 80*a*. If so, the process proceeds to step S32. If not, the process terminates after the communication controller 80*b* informs the terminal 100 via the terminal 90 that the IP address is not registered.

At step S32, a request for entering the support password is sent to the terminal. The communication controller 80b requests the terminal 100 via the network 90 that the user of the terminal 100 enter his or her support password registered when having purchased the terminal 100.

At step S33, support password from the terminal is received. The communication controller 80*b* receives the support password from the terminal 100 via the network 90. At step S34, validity of the support password is verified. The password checker 80*d* verifies whether or not the support password from the terminal 100 is valid.

At this point of the server side process, in view of the support password sent from the terminal 100, the IP address received by the communication controller 80*b* of the server 80 is compared with the registered password searched through the database 80*a* by the search unit 80*c* as associated with the IP address. When both are in agreement, the process proceeds to step S35, given that the support password received is valid. Otherwise, the process ends after the communication controller 80*b* notifies the terminal 100 via the network 90 that the support password is invalid.

At step S35, settings on the terminal are checked. The communication controller 80*b* receives current settings on the terminal 100 to allow the settings recognizer 80*e* to diagnose them. At step S36, support starts. The server 80 begins to provide the user of the terminal 100 with support tailored to the terminal's current settings as recognized by its settings recognizer 80*e*, online, or by phone or e-mail, for example. Alternatively, the server 80 may automatically optimize the improper settings directly via the network 90. In the above-described manner, the user can change or correct any improper proper settings on his or her computer or like equipment hassle-free under manufacturer's guidance.

Referring then to FIGS. 10 through 13, a product management system and method according to a third embodiment of the present invention will be described. The third embodiment refers to a support event which is installing a product such as software to a terminal.

Figure 10:
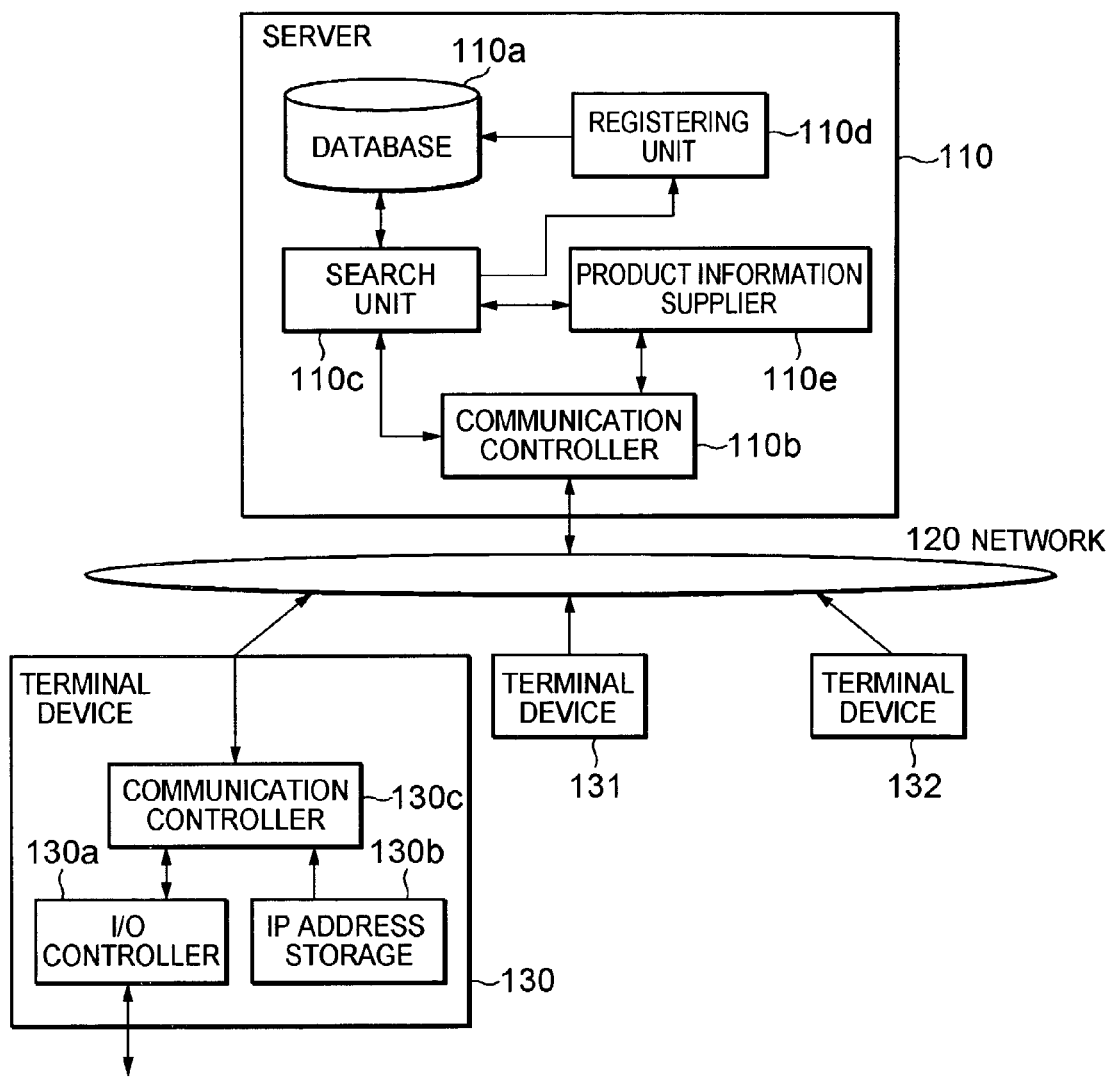
FIG. 10 shows still another exemplary configuration of a product management system according to the present invention.

As shown in FIG. 10, an exemplary product management system according to the third embodiment comprises, similarly to the first and second embodiments, a server 110, and a plurality of terminals 130, 131 and 132 coupled to the server 110 via a network 120. It should be recognized that the terminals 131 and 132 are configured and operate similarly to the terminal 130 and may hence be represented by the terminal 130 in the following description whenever appropriate.

In the third embodiment, differently from the first and second embodiments, the server 110 is located at a manufacturer of software, for example. The terminals 130 to 132, which can be PCs, digital televisions, etc. having IP address and IP connectable are linked with the server 110 under IPv6 similarly to the first and second embodiments.

The server 110 has a database 110*a* in which at least IP addresses of the terminals 130 to 132 and serial numbers of software products installed to them are registered as registration information, a communication controller 110*b* for controlling communication with the terminals 130 to 132 via the network 120, a search unit 110*c* that searches relevant registration information recorded in the database 110*a* in accordance with a serial number and IP address received, a registering unit 110*d* that adds a serial number and an IP address to the database 110*a*, and a product information supplier 110*e* that supplies product information as addressed to a registered IP address. The database 110*a* can be a storage medium such as a HD (Hard Disk) containing registration information therein.

As presented in FIG. 11, information recorded in the database 110*a* as registered information includes, for example, serial numbers of software products, IP addresses of terminals which the software products are installed to, and purchase dates of the software products.

The communication controller 110*b* may be a modem, for example, that permits communication between the server 110 and the terminals 130 to 132 via the network 120 under the control of a CPU (not shown). The search unit 110*c*, registering unit 110*d* and product information supplier 110*e* form a functional block operable by programs contained on a storage such as a ROM (not shown) as controlled by the CPU. Since the terminals 130 to 132 are similar to their counterparts of the first and second embodiments, their description is not duplicated.

Turning now to flowcharts shown in FIGS. 12 and 13, steps are described of an exemplary product management method according to the third embodiment, which is implemented by communication between any of the terminals 130 to 132 and the server 110 under administration of the product management system of FIG. 11 to cope with a support event.

The flowchart of FIG. 12 shows a terminal side process performed in the product management method according to the third embodiment, in which the support event is installing software to the terminal 130, for example. At step S40, installing software to the terminal is started. A user of the terminal 130 installs to the terminal 130 software contained on a recording medium, such as a Compact Disc-Read Only Memory (CD-ROM), for example.

At step S41, a serial number of the software is entered to the terminal. When installing the software, the user enters its serial number over a display (not shown) to pass that information to the terminal 130 via an I/O controller 130*a*.

At step S42, the serial number and the IP address are notified to the server. The communication controller 130*c* sends the serial number of the software entered to the server 110 via the network 120, along with the IP address stored in an IP address storage 130*b*.

At step S43, relevant product information from the server is received. When the software is installed satisfactorily, a communication controller 130*c* receives from the server 110 via the network 120 relevant product information such as software updates from time to time, which is then displayed on the display (not shown) as interfaced by the I/O controller 130*a*.

The flowchart shown in FIG. 13, in turn, shows a server side process in the above product management method according to the third embodiment performed in response to the serial number and IP address sent from the terminal 130 when the software 5 is installed at the terminal 130.

At step S50, the serial number and the IP address from the terminal is received. The communication controller 110*b* of the server 110 receives the serial number of the software and the IP address of the terminal 130 which are sent from the terminal 130 when the software is installed to the terminal 130.

At step S51, whether or not the IP address is registered is checked. The search unit 110*c* checks whether or not the IP address associated with the received serial number is registered in the database 110a. If not, the process proceeds to step S52. Otherwise, the process jumps to step S54.

At step S52, the serial number and IP address are registered. The registering unit 110d adds the serial number and IP address from the terminal 130 to the database 110a.

At step S53, product information is supplied to the terminal. For example, to upgrade the software installed to the terminal 130 whose registration information is recorded in the database 110a, the search unit 110c searches the database 110a to find the IP address of the terminal 130 to which the software is installed, in accordance with the serial number of the installed software, and the product information supplier 100e sends product information such as upgrades to that IP address, and then the terminal 130 receives the information from the communication controller 110b via network 120. In addition, the manufacturer of the software can help the user install and set up the upgrades online if complicated setting is involved.

At step S54, warning about unauthorized use is sent to the user. The requesting user is warned that the software is proprietary to another user, and that the software will not be able to be used any longer.

To upgrade a purchased software product, the manufacturer of that product may automatically upgrade that product on the terminal 130 directly online or provide the terminal 130 with product information by e-mail, for example, via the network 120 from time to time.

In this way, a manufacturer of the software can, for example, upgrade the software of any of the terminals 130 to 132 automatically, and e-mail product information to them via the network 120 as necessary. Also, in this way, the software manufacturer can prevent unauthorized use of software.

The product management system according to the present invention may include more than three terminals. Furthermore, the above-disclosed three embodiments may be merged into one function.

Although the invention having been described hereinabove in its preferred form with a certain degree of particularity, other changes, variations, combinations and sub-combinations are possible therein. It is therefore to be understood that any modifications will be practiced otherwise than as specifically described herein without departing from the scope and spirit of the present invention.

What is claimed is:

1. A system of managing products via a network, comprising:
    a plurality of terminal devices each having an IP address of said terminal device, and a serial number of at least one product introduced into said terminal device; and
    a server, the server comprising:
        means for storing a registration information, wherein said registration information comprises at least an IP address, a serial number, a purchase date and a warranty period;
        means for receiving an IP address, the serial number, and information associated with a failure from said terminal device via said network;
        means for searching said stored registration information in accordance with said received IP address;
        means for determining whether or not the terminal device is within the warranty period by comparison of the purchase date with a current date; and
        means for sending information to a registered IP address, the information relating to the terminal device and the product introduced into said terminal device,
        wherein if said terminal device is within the warranty period, said server informs said terminal device via the network that said terminal device will be fixed gratis, and if not, said server informs said terminal device via the network that a chargeable repair will be provided together with a reason.

2. The system according to claim 1, wherein each of said terminal devices, when introducing said product into said terminal device, sends at least said serial number and said IP address to said server via said network, and said server registers at least said serial number and said IP address therein.

3. The system according to claim 1, wherein the information sent to the terminal device related to the product introduced into the terminal device includes product upgrade information.

4. The system according to claim 1, wherein the information sent to the terminal device related to the product introduced into the terminal device includes product operation, installation or repair information.

5. A server for managing products for a plurality of terminal devices accessing said server via a network, said server comprising:
    means for storing an IP address of each said terminal devices, a serial number, a purchase date, and a warranty period of at least one product introduced into said terminal device;
    means for receiving a support request including an IP address, the serial number and a information associated with failure from said terminal device via said network and receiving information regarding a product introduced into said terminal device; and
    means for searching a registration information in accordance with said received IP address and said received product information;
    means for determining whether or not the terminal device is within the warranty period by comparison of the purchase date with a current date; and
    means for sending information to a registered IP address, the information relating to the terminal device and the product introduced into said terminal device,
    wherein if said terminal device is within the warranty period, said server informs said terminal device via the network that said terminal device will be fixed gratis, and if not, said server informs said terminal device via the network that a chargeable repair will be provided together with a reason.

6. The server according to claim 5, wherein said receiving means receives settings of each of said terminal devices.

7. The server according to claim 5, wherein said receiving means receives said serial number.

8. The server according to claim 7, further comprising means for registering said registration information including said serial number and said IP address in said registration information storage means in a corresponding manner.

9. A terminal device accessing a server via a network, comprising:
    means for registering an IP address of each terminal device, a serial number, and a purchase date of at least one product introduced into said terminal device;
    means for sending a support request including information associated with a failure to said server via said network when a support event occurs on said terminal device; and
    means for sending an IP address, the serial number of said terminal device simultaneously with said sending of said support request, via said network;
    means for receiving information indicative of gratis service if said terminal device is within the warranty period, and if not, receiving information indicative of a chargeable repair and an associated reason from said server relating to said support request and the product introduced in said terminal device; and means for, when said support event is a setting problem, informing said server about settings of said terminal device together with said IP address via said network.

10. The terminal device according to claim 9, further comprising means for, when said support event is introducing said product into said terminal device, sending a serial number of said product to said server via said network.

11. A method of managing products between a server and a plurality of terminal devices via a network, comprising the steps of:

registering an IP address of each said terminal device, a serial number, a purchase date and a warranty period of at least one product introduced into said terminal device;

receiving a support request including the serial number, and said IP address and information associated with a failure from said terminal device via said network when a support event occurs on said terminal device, and receiving product information regarding a product introduced into said terminal device;

searching a registration information in accordance with said IP address and with said product information;

providing said terminal device with support suitable for said support event and information suitable for said product introduced into said terminal device; and receiving information indicative of gratis service if said terminal device is within the warranty period, and if not, receiving information indicative of a chargeable repair and an associated reason.

12. The method according to claim 11, further comprising:

receiving, when said support event is introducing said product into said terminal device, at least said serial number and said IP address from said terminal device via said network; and registering said serial number and said IP address.

13. The method according to claim 11, wherein the information provided to the terminal device related to the product introduced into the terminal device includes product upgrade information.

14. The method according to claim 11, wherein the information provided to the terminal device related to the product introduced into the terminal device includes product operation, installation or repair information.

15. A method of managing products between a server and a plurality of terminal devices via a network, wherein said server registers an IP address of each said terminal device, a serial number of at least one product introduced into said terminal device, said method comprising the step of:

sending a support request including the serial number, said IP address, and information associated with a failure to said server via said network when a support event occurs on said terminal device;

receiving information from said server relating to said service request and a product introduced in said terminal device; and sending, information indicative of gratis service if said terminal device is within the warranty period, and if not, receiving information indicative of a chargeable repair and an associated reason.

16. The method according to claim 15, further comprising: sending, when introducing said product into said terminal device, said serial number of said product and said IP address to said server via said network.

* * * * *